(12) United States Patent
Kono (10) Patent No.: US 9,971,225 B2
(45) Date of Patent: May 15, 2018

(54) SPOT SIZE CONVERTER, SEMICONDUCTOR OPTICAL DEVICE

(71) Applicant: SUMITOMO ELECTRIC INDUSTRIES, LTD., Osaka (JP)

(72) Inventor: Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/499,500

(22) Filed: Apr. 27, 2017

(65) Prior Publication Data

US 2017/0315419 A1 Nov. 2, 2017

(30) Foreign Application Priority Data

May 2, 2016 (JP) ................. 2016-092601

(51) Int. Cl.
G02B 6/122 (2006.01)
G02B 6/30 (2006.01)
G02B 6/125 (2006.01)
G02B 6/12 (2006.01)
G02F 1/21 (2006.01)
G02F 1/01 (2006.01)

(52) U.S. Cl.
CPC ............. *G02F 1/21* (2013.01); *G02B 6/125* (2013.01); *G02B 6/1228* (2013.01); *G02B 6/30* (2013.01); *G02F 1/011* (2013.01); *G02B 2006/12142* (2013.01); *G02F 2001/212* (2013.01)

(58) Field of Classification Search
CPC ...... G02F 1/21; G02F 1/011; G02F 2001/212; G02B 6/30; G02B 6/125; G02B 6/1228; G02B 2006/12142
See application file for complete search history.

(56) References Cited

U.S. PATENT DOCUMENTS 6,768,758 B1 * 7/2004 Hamamoto ............... H01S 5/10
372/46.01

OTHER PUBLICATIONS

Moerman, Ingrid, et al., "A Review on Fabrication Technologies for the Monolithic Integration of Tapers with III-V Semiconductor Devices", *IEEE Journal of Selected Topics in Quantum Electronics*, vol. 3, No. 6, Dec. 1997, p. 1308-1320.

* cited by examiner

Primary Examiner — John M Bedtelyon
(74) Attorney, Agent, or Firm — Smith, Gambrell & Russell, LLP (57) ABSTRACT

A spot size converter includes: a first semiconductor waveguide structure having a first width enabling single mode propagation; a second semiconductor waveguide structure having a second width greater than the first width, a second semiconductor waveguide structure including an end face for optically coupling with an external waveguide; a third semiconductor waveguide structure having a third width greater than the first and second widths, the third semiconductor waveguide structure being optically coupled to the second semiconductor waveguide structure; and a single tapered waveguide having a first end portion connected to the third semiconductor waveguide structure, and a second end portion connected to the first semiconductor waveguide structure, the single tapered waveguide having a width gradually changing in a direction from the first end portion to the second end portion.

16 Claims, 8 Drawing Sheets

SPOT SIZE CONVERTER, SEMICONDUCTOR OPTICAL DEVICE

BACKGROUND OF THE INVENTION

Field of the Invention

The present invention relates to a spot size converter and a semiconductor optical device. This application claims the benefit of priority from Japanese Patent Application No. 2016-092601 filed on May 2, 2016, which is herein incorporated by reference in its entirety.

Related Background Art

Non-Patent Document 1 (IEEE JOURNAL OF SELECTED TOPICS IN QUANTUM ELECTRONICS, VOL. 3, NO. 6, DECEMBER 1997, pp. 1308-1320) discloses a spot size converter.

SUMMARY OF THE INVENTION

A spot size converter according to one aspect of the present invention includes: a first semiconductor waveguide structure having a first width enabling single mode propagation; a second semiconductor waveguide structure having a second width greater than the first width, the second semiconductor waveguide structure including an end face for optically coupling with an external waveguide; a third semiconductor waveguide structure having a third width greater than the first width and the second width, the third semiconductor waveguide structure being optically coupled to the second semiconductor waveguide structure; and a single tapered waveguide having a first end portion connected to the third semiconductor waveguide structure, and a second end portion connected to the first semiconductor waveguide structure, the single tapered waveguide having a width gradually changing in a direction from the first end portion to the second end portion.

A semiconductor optical device according to another aspect of the present invention includes: a spot size converter disposed on a substrate; and a semiconductor optical device optically coupled to the spot size converter, the semiconductor optical device being disposed on the substrate, the spot size converter including: a first semiconductor waveguide structure having a first width enabling single mode propagation; a second semiconductor waveguide structure having a second width greater than the first width, the second semiconductor waveguide structure including an end face for optically coupling with an external waveguide; a third semiconductor waveguide structure having a third width greater than the first width and the second width, the third semiconductor waveguide structure being optically coupled to the second semiconductor waveguide structure; and a single tapered waveguide having a first end portion connected to the third semiconductor waveguide structure, and a second end portion connected to the first semiconductor waveguide structure, the single tapered waveguide having a width gradually changing in a direction from the first end portion to the second end portion.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

DESCRIPTION OF THE EMBODIMENTS

The spot size converter in Non-Patent Document 1 includes an end face to be coupled to the external waveguide and has a waveguide extending in the direction from the internal waveguide thereof to the end face. Inventor's teachings reveal that the positional deviation of an optical beam incident on the spot size converter from outside excites one or more higher-order modes in a waveguide of the spot size converter. The spot size converter converts the spot size of the incident beam, and the excited higher-order modes in the spot size converter propagate together with the fundamental mode to the internal waveguide. Studies conducted by the inventor reveal that the propagation of the converted optical beam through the internal waveguide attenuates a part of the higher-order modes and that the remaining higher-order modes cause an optical processor, which receives the optical beam from the spot size converter, to produce unexpected effects.

An object of one aspect of the present invention is to provide a spot size converter which can reduce odd-order modes. An object of another aspect of the present invention is to provide a semiconductor optical device including the spot size converter.

Specific embodiments according to the above aspects will be described below.

A spot size converter according to an embodiment includes: a first semiconductor waveguide structure having a first width enabling single mode propagation; a second semiconductor waveguide structure having a second width greater than the first width, the second semiconductor waveguide structure including an end face for optically coupling with an external waveguide; a third semiconductor waveguide structure having a third width greater than the first width and the second width, the third semiconductor waveguide structure being optically coupled to the second semiconductor waveguide structure; and a single tapered waveguide having a first end portion connected to the third semiconductor waveguide structure, and a second end portion connected to the first semiconductor waveguide structure, the single tapered waveguide having a width gradually changing in a direction from the first end portion to the second end portion.

In the spot size converter, the second semiconductor waveguide structure has a second width larger than the first width of the first semiconductor waveguide structure and receives an incident beam from an external optical waveguide optically coupled thereto. This incident beam is converted to a waveguide mode by the second semiconductor waveguide structure, and propagates through the second semiconductor waveguide structure. The second semiconductor waveguide structure may receive an optical beam from an external optical waveguide which is misaligned with respect to the spot size converter. The misalignment causes the second semiconductor waveguide structure to produce the fundamental mode of the optical beam but also to excite higher-order modes. The optical beam enters the third semiconductor waveguide structure, which has the third width larger than the second width of the second semiconductor waveguide structure, from the second semiconductor waveguide structure. The third semiconductor waveguide structure attenuates odd-order modes of the optical beam to produce a filtered beam. The filtered beam enters the tapered waveguide. The tapered waveguide, the width of which gradually decreases in the direction from one end thereof to the other end, can convert the spot size of the filtered beam.

In the spot size converter according to an embodiment, each of the single tapered waveguide, the second semiconductor waveguide structure, and the third semiconductor waveguide structure includes a laminate, and the laminate includes a first cladding layer, a core layer, and a second cladding layer.

The spot size converter allows the tapered waveguide, the second semiconductor waveguide structure, and the third semiconductor waveguide structure to have the same semiconductor laminated structure.

In the spot size converter according to an embodiment, the first semiconductor waveguide structure, the single tapered waveguide, the second semiconductor waveguide structure, and the third semiconductor waveguide structure are covered with a silicon-based inorganic insulating film.

In the spot size converter, the refractive index of the silicon-based inorganic insulating film is smaller than that of the semiconductor region constituting the spot size converter.

In an embodiment of the spot size converter, the second width of the second semiconductor waveguide structure is 1.5 micrometers or more.

The above range of the second width enables suitably optical coupling of the spot size converter with an external waveguide.

A semiconductor optical device according to an embodiment includes: a spot size converter disposed on a substrate; and a semiconductor optical element optically coupled to the spot size converter, the semiconductor optical device being disposed on the substrate. The spot size converter includes: a first semiconductor waveguide structure having a first width enabling single mode propagation; a second semiconductor waveguide structure having a second width greater than the first width, the second semiconductor waveguide structure including an end face for optically coupling with an external waveguide; a third semiconductor waveguide structure having a third width greater than the first width and the second width, the third semiconductor waveguide structure being optically coupled to the second semiconductor waveguide structure; and a single tapered waveguide having a first end portion connected to the third semiconductor waveguide structure, and a second end portion connected to the first semiconductor waveguide structure, the single tapered waveguide having a width gradually changing in a direction from the first end portion to the second end portion.

The semiconductor optical device allows the semiconductor optical element to receive an optical beam the higher odd-order modes of which the spot size converter has reduced.

Teachings of the present invention can be readily understood by considering the following detailed description with reference to the accompanying drawings shown as examples. Referring to the accompanying drawings, embodiments of a spot size converter and a semiconductor optical device according to the present invention will be described. To facilitate understanding, identical reference numerals are used, where possible, to designate identical elements that are common to the figures.

Figure 1:
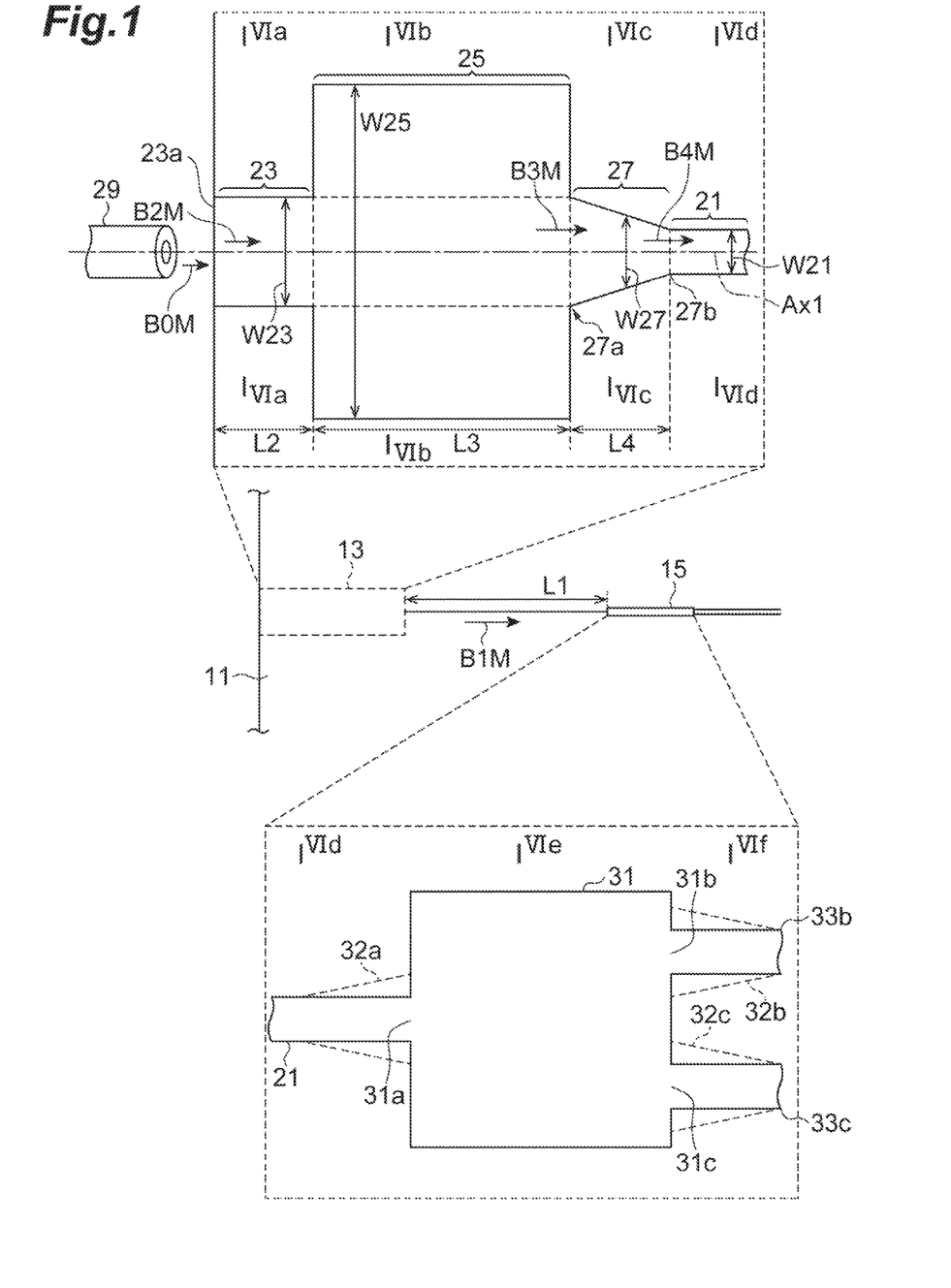
FIG. 1 is a schematic view showing a semiconductor optical device according to the present embodiment.

FIG. 1 is a schematic view showing a semiconductor optical device according to the present embodiment. The semiconductor optical device 11 includes a spot size converter 13 and a semiconductor optical element 15, which is optically coupled to the spot size converter 13. The semiconductor optical device 11 allows the semiconductor optical device 15 to receive an optical beam B1M, odd-order higher modes of which the spot size converter 13 has reduced.

The spot size converter 13 includes a first semiconductor waveguide structure 21, a second semiconductor waveguide structure 23, a third semiconductor waveguide structure 25, and a tapered waveguide 27. The first semiconductor waveguide structure 21 has a first width W21 enabling single mode propagation. The second semiconductor waveguide structure 23 has a second width W23 larger than the first width W21 of the first semiconductor waveguide structure 21. The third semiconductor waveguide structure 25 has a third width W25 larger than the first width W21 of the first semiconductor waveguide structure 21 and the second width W23 of the second semiconductor waveguide structure 23. The tapered waveguide 27 has a first end 27a and a second end 27b. The tapered waveguide 27 has a fourth width W27, which gradually decreases in the direction from the first end 27a to the second end 27b. The first end 27a is optically coupled to the third semiconductor waveguide structure 25, and the second end 27b is optically coupled to the first semiconductor waveguide structure 21. The second semiconductor waveguide structure 23, the third semiconductor waveguide structure 25, and the tapered waveguide 27 are arranged in the direction of the first axis Ax1. The third semiconductor waveguide structure 25 is disposed between the tapered waveguide 27 and the second semiconductor waveguide structure 23. The second semiconductor waveguide structure 23 is optically coupled to the third semiconductor waveguide structure 25. Referring to FIG. 1, the third semiconductor waveguide structure 25 is connected to the single tapered waveguide 27. The tapered waveguide 27 is positioned with respect to the second semiconductor waveguide structure 23 and receives the optical beam from the second semiconductor waveguide structure 23 through the third semiconductor waveguide structure 25.

The second semiconductor waveguide structure 23 has an end face 23a that can be optically coupled to an external optical waveguide 29. The first semiconductor waveguide structure 21 is optically coupled to the semiconductor optical element 15. The semiconductor optical element 15 may include, for example, a multimode interference device, a Mach-Zehnder modulator, a Y-branch, or a directional coupler.

In the spot size converter 13, the second semiconductor waveguide structure 23 has a second width W23 larger than the first width W21 of the first semiconductor waveguide structure 21, and receives the incident beam B0M, which is emitted by the external optical waveguide 29. The incident beam B0M is converted by the second semiconductor waveguide structure 23 into a waveguide mode, and the beam thus converted propagates through the second semiconductor waveguide structure 23, and is referred to as "an optical beam B2M," which propagates in the second semiconductor waveguide structure 23. The optical beam B2M includes not only the fundamental mode but also one or more higher-order modes. The optical beam B2M enters the third semiconductor waveguide structure 25, which has the third width W25 larger than the second width W23 of the second semiconductor waveguide structure 23, from the second semiconductor waveguide structure 23. The third semiconductor waveguide structure 25 attenuates odd-order higher modes of the optical beam B2M to produce a filtered beam B3M therefrom. The filtered beam B3M enters the tapered waveguide 27, and the tapered waveguide 27 converts the spot size of the filtered beam B3M to generate the optical beam B4M, which can propagates the waveguide with less optical loss.

In the present embodiment, the first end 27a is connected to the third semiconductor waveguide structure 25, and the second end 27b is connected to the first semiconductor waveguide structure 21. The second semiconductor waveguide structure 23 is connected to the third semiconductor waveguide structure 25. The optical beam entering the end face 23a of the second semiconductor waveguide structure 23 propagates therein in the direction of the first axis Ax1 and reaches the tapered waveguide 27 and also propagates through the tapered waveguide 27 to the first semiconductor waveguide structure 21.

In the present embodiment, the third length L3 of the third semiconductor waveguide structure 25 is larger than the fourth length L4 of the tapered waveguide 27.

First length L1: for example, 200 micrometers or more.
Second length L2: 2 micrometers or more, preferably 20 micrometers or more.
Third length L3: for example, 193 micrometers.
Fourth length L4: for example, 90 micrometers.

The first semiconductor waveguide structure 21 may have a substantially constant width; the second semiconductor waveguide structure 23 may have a substantially constant width; and the third semiconductor waveguide structure 25 may have a substantially constant width.
First width W21: for example, 1.25 micrometers.
Second width W23: for example, 3.5 micrometers in the rage of 1.5 to 15 micrometers.
Third width W25: for example, 9.6 micrometers in the rage of 2 to 20 micrometers.
The fourth width W27: a gradually-changing width from the second width W23 to the first width W21, specifically, a width changing from 3.5 to 1.25 micrometers.
External optical waveguide 29: for example, a single mode optical fiber.

In the example, the width and the thickness of the second semiconductor waveguide structure 23 are made substantially constant, and the width and the thickness of the third semiconductor waveguide structure 25 are made substantially constant. These structures disable the second semiconductor waveguide structure 23 and the third semiconductor waveguide structure 25 to substantially convert the spot size of an optical beam propagating therethrough. In a preferred embodiment, the width of the tapered waveguide 27 at the first end 27a is substantially the same as the second width W23 of the second semiconductor waveguide structure 23. The third semiconductor waveguide structure 25 produces an optical beam including the fundamental mode and remaining higher-order modes, which are unfiltered by the third semiconductor waveguide structure 25, and the optical beam thus produced is transmitted therefrom to the tapered waveguide 27. The third width W25 and the third length L3 of the third semiconductor waveguide structure 25 are determined so as to enable removal of a desired higher-order mode from the incident beam. In order to enable suitable optical coupling to the external waveguide, the second width W23 of the second semiconductor waveguide structure 23 is preferably 1.5 micrometers or more. The tapered waveguide 27 is positioned with respect to the third semiconductor waveguide structure 25, and the first end 27a thereof is positioned with respect to the second width W23 of the second semiconductor waveguide structure 23. The tapered waveguide 27 has one side face and the other side face in alignment with one side face and the other side face of the second semiconductor waveguide structure 23 at the first end 27a, respectively.

Referring to FIG. 1, the semiconductor optical element 15 includes a multimode interference device 31 (MMI). The multimode interference device 31 can be, for example, 1×2 MMI as shown in FIG. 1. The multimode interference device 31 of the 1×2 MMI includes a first port 31a, a second port 31b, and a third port 31c. The first port 31a is connected to the first semiconductor waveguide structure 21, and the second port 31b and the third port 31c are connected to the fourth semiconductor waveguide structure 33b and the fifth semiconductor waveguide structure 33c, respectively, each of which may include a single mode waveguide. If necessary, the first port 31a, the second port 31b and the third port 31c may be provided with respective tapered joints 32a, 32b, and 32c, which are indicated by broken lines. The first port 31a receives the optical beam B1M. The multimode interference device 31 branches the optical beam B1M to provide the second port 31b and the third port 31c with respective branched optical beams.

Figure 2:
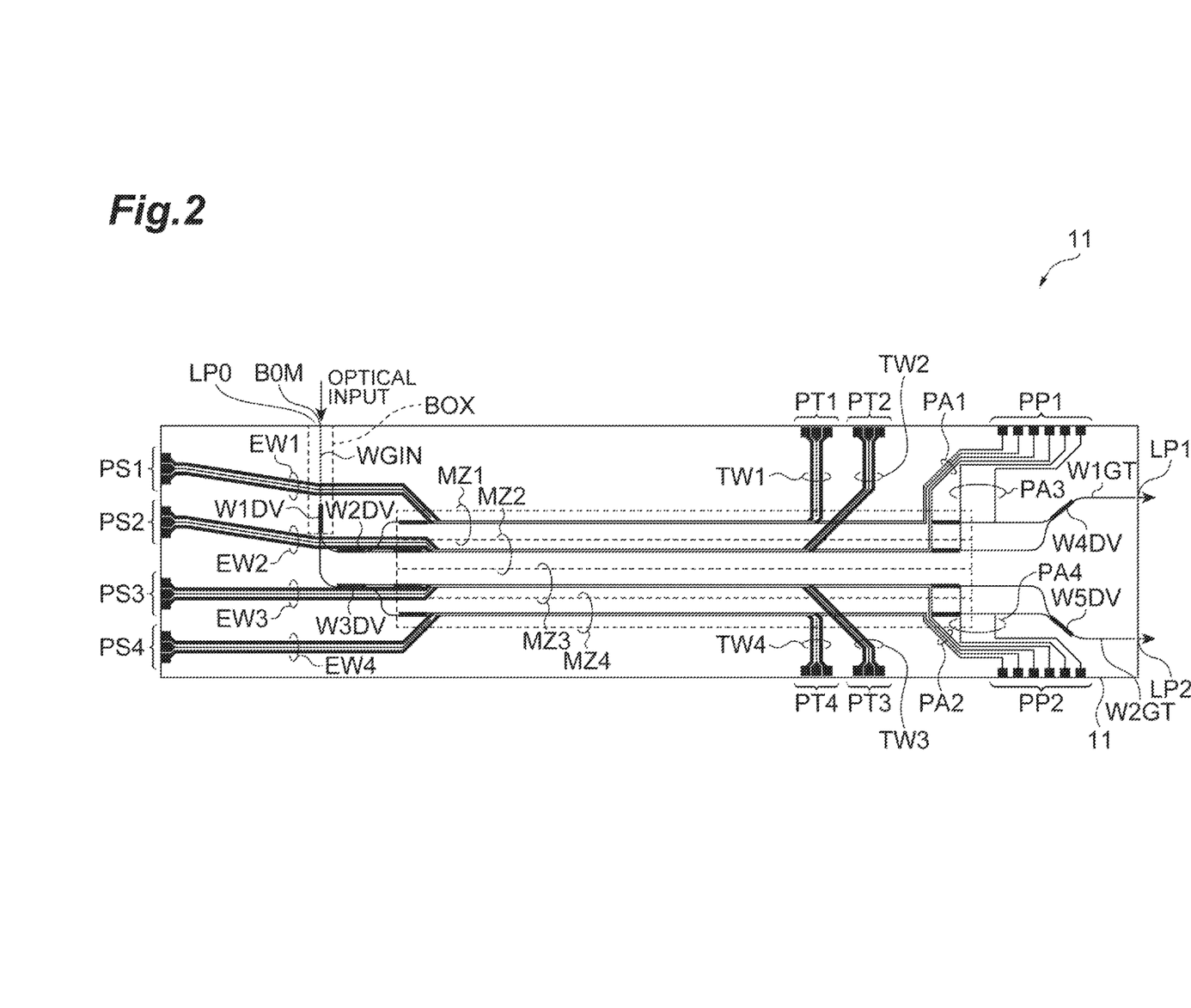
FIG. 2 is a schematic plan view showing an exemplary semiconductor optical device monolithically integrating Mach-Zehnder modulators.

FIG. 2 is a schematic plan view showing an exemplary semiconductor optical device monolithically integrating Mach-Zehnder modulators. Referring to FIG. 2, in the present embodiment, the spot size converter 13 and the semiconductor optical element 15 are provided in an area indicated by the broken line BOX shown therein. The semiconductor optical element 15 includes Mach-Zehnder modulators MZ1, MZ2, MZ3, and MZ4. The Mach-Zehnder modulators MZ1, MZ2, MZ3, and MZ4 are optically coupled to the input waveguide WGIN via the first branching waveguide W1DV, the second branching waveguide W2DV and the third branching waveguide W3DV. The input waveguide WGIN is coupled to the input port LP0. The Mach-Zehnder modulators MZ1, MZ2, MZ3, and MZ4 receive light from the input port LP0 via the above multimode interference devices. The Mach-Zehnder modulators MZ1 and MZ2 are optically coupled to the first output waveguide W1GT via the fourth branch waveguide W4DV, and the Mach-Zehnder modulators MZ3 and MZ4 are optically coupled via the fifth branch waveguide W5DV to the second output waveguide W2GT. The first output waveguide W1GT and the second output waveguide W2GT are coupled to the first output port LP1 and the second output port LP2, respectively. The first output port LP1 and the second output port LP2 provide respective optical outputs.

As shown in FIG. 2, the first transmission line EW1, the second transmission line EW2, the third transmission line EW3, and the fourth transmission line EW4 are coupled to the first modulating electrodes ED1M and the first phase adjusting electrodes ED1P of the Mach-Zehnder modulators MZ1, MZ2, MZ3, and MZ4, respectively, which receive respective modulation signals from the pad electrodes (PS1 to PS4). The first terminating line TW1, the second terminating line TW2, the third terminating line TW3, and the fourth terminating line TW4 are connected to the pad electrodes (PT1 to PT4) for terminations, respectively, and are connected to the respective first modulating electrodes ED1M of the Mach-Zehnder modulator MZ1, MZ2, MZ3, and MZ4. The first phase adjustment electrode ED1P and the outer phase adjustment electrode ED1PM are connected to the respective pad electrodes (PP1 and PP2). A part or all of the first transmission line EW1, the second transmission line EW2, the third transmission line EW3, and the fourth transmission line EW4 and a part or all of the first termination line TW1, the second termination line TW2, the third termination line TW3, and the fourth termination line TW4 extend across the optical waveguides.

Figure 3:
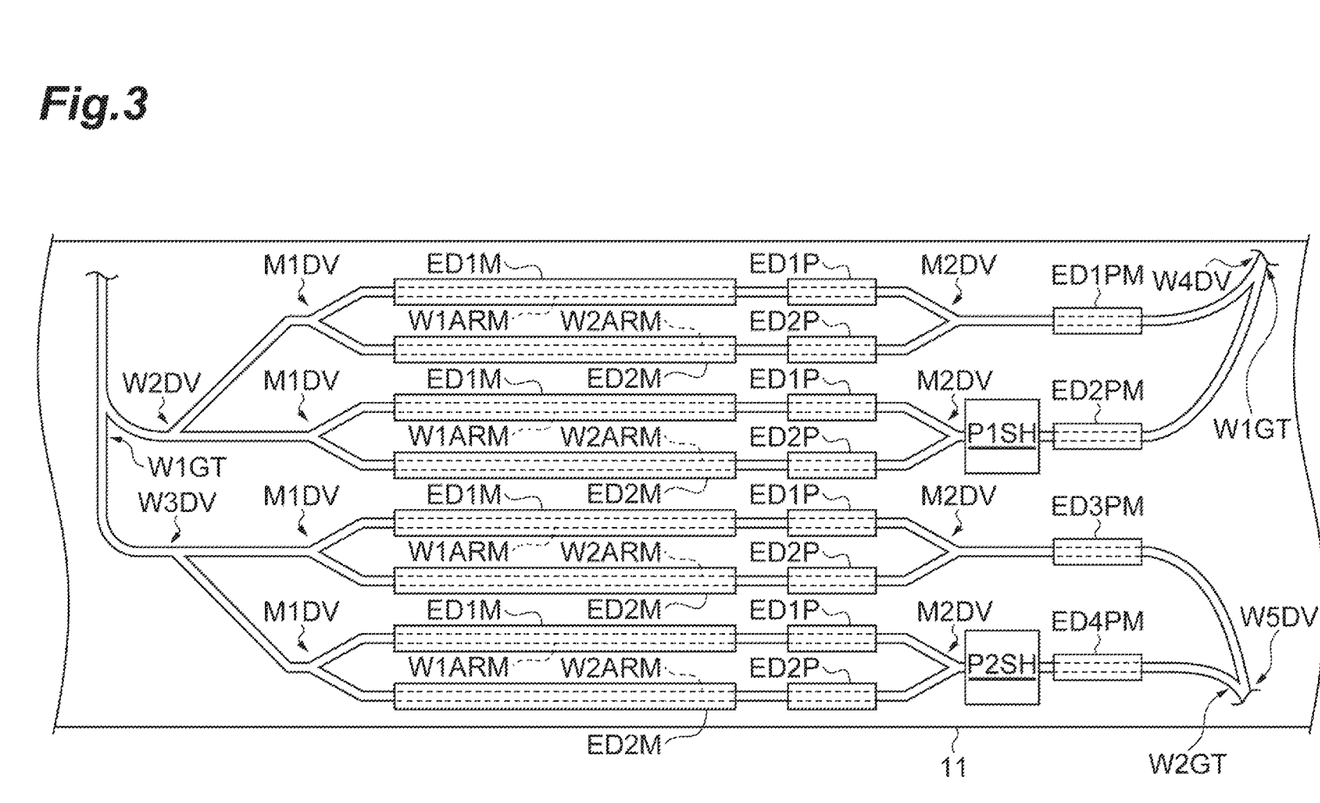
FIG. 3 is a schematic view showing the arrangement of the waveguides of the Mach-Zehnder modulators MZ1, MZ2, MZ3, and MZ4.

Referring to FIG. 3, each of the Mach-Zehnder modulators MZ1, MZ2, MZ3, and MZ4 includes an input-side branching waveguide M1DV, a first arm waveguide W1ARM, a second arm waveguide W2ARM, and an output-side branching waveguide M2DV. In each of the Mach-Zehnder-modulators MZ1, MZ2, MZ3, and MZ4, the first modulation electrode ED1M and the first phase adjustment electrode ED1P are provided on the first arm waveguide W1ARM, and the second modulation electrode ED2M and the second phase adjustment electrode ED2P are provided on the second arm waveguide W2ARM. The output of the Mach-Zehnder-modulator MZ2 is coupled with the output of the Mach-Zehnder modulator MZ1 via the first ($\pi/2$) phase shifter P1SH to enable optical multiplex. The output of the Mach-Zehnder-modulator MZ4 is coupled with the output of the Mach-Zehnder modulator MZ3 via the second ($\pi/2$) phase shifter P2SH to enable optical multiplex. The outer phase adjustment electrodes ED1PM, ED2PM, ED3PM, and ED4PM are provided on the output waveguides of the Mach-Zehnder modulators MZ1, MZ2, MZ3, and MZ4, respectively. The outer phase adjustment electrodes ED1PM and ED2PM apply phase adjustment to respective modulated optical beams from the Mach-Zehnder modulators MZ1 and MZ2, and the respective optical beams thus adjusted are multiplexed to form the multiplexed optical beam, which propagates through the first output waveguide W1GT. The outer phase adjustment electrodes ED3PM and ED4PM apply phase adjustment to respective modulated optical beams from the Mach-Zehnder modulators MZ3 and MZ4, and the respective optical beams thus adjusted are multiplexed to form the multiplexed optical beam. In order to enable the multiplex, each of the Mach-Zehnder modulators MZ1, MZ2, MZ3, and MZ4 contains 1×2 MMI.

Figure 4A:
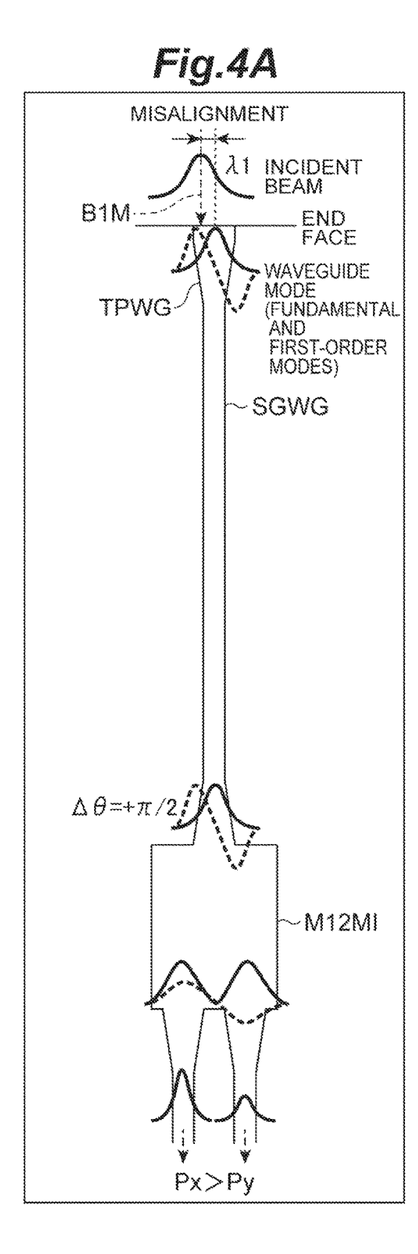
FIGS. 4A and 4B are schematic views each showing a semiconductor device which includes a tapered waveguide TPWG extending from an end face thereof, a single mode waveguide SGWG connected to the tapered waveguide TPWG, and a 1×2 multimode interferometer M12MI connected to the single mode waveguide SGWG.
Figure 4B:
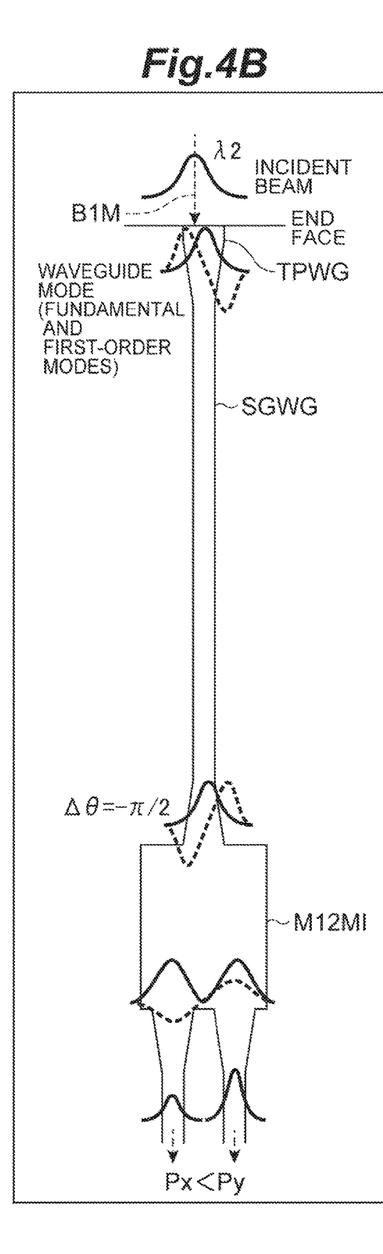

FIGS. 4A and 4B are schematic views each showing a semiconductor device including a tapered waveguide TPWG, a single-mode waveguide SGWG, and a 1×2 multimode interference device M12MI. The tapered waveguide TPWG extends from the device end face. The single waveguide SGWG, which is connected to the tapered waveguide TPWG, enables single-mode propagation. The 1×2 multimode interference device M12MI is connected to the single mode waveguide SGWG.

Referring FIG. 4A, the optical beam B1M (wavelength $\lambda 1$) enters the tapered waveguide TPWG. The tapered waveguide TPWG converts the spot size of the optical beam B1M to generate a waveguide mode. The deviation of the optical beam B1M from the center axis of the tapered waveguide TPWG causes the tapered waveguide TPWG to generate not only the fundamental mode but also a higher-order mode from the optical beam B1M. Referring to FIG. 4A, the fundamental mode and the first-order mode among the waveguide modes in the tapered waveguide TPWG have respective electric field profiles in the vicinity of the tapered waveguide TPWG, and a still higher-order modes are omitted therein. The fundamental mode has a symmetric electric field distribution with a peak on the center axis of the tapered waveguide TPWG, and the first-order mode has an antisymmetric electric field distribution with two extreme values, which are on respective sides of the center axis of the tapered waveguide TPWG.

Referring to FIG. 4B, the optical beam B1M (wavelength $\lambda 2$ different from $\lambda 1$) enters the tapered waveguide TPWG. The tapered waveguide TPWG converts the spot size of the optical beam B1M to generate a waveguide mode. The optical beam B2M deviating from the center axis of the tapered waveguide TPWG causes the tapered waveguide TPWG to generates not only a fundamental mode but also a higher-order mode from the optical beam B1M. Referring to FIG. 4B, the fundamental mode and the first-order mode among the waveguide modes in the tapered waveguide TPWG have respective electric field profiles in the vicinity of the tapered waveguide TPWG, and further higher-modes are omitted therein. The fundamental mode has a symmetric electric field distribution with a peak on the center axis of the tapered waveguide TPWG, and the first-order mode has another antisymmetric electric field distribution with two extreme values, which are on respective sides of the center axis of the tapered waveguide TPWG.

The waveguide beam including the fundamental mode and the higher-order mode propagates through the single mode waveguide SGWG and reaches the input port of the 1×2 multimode interference device M12M1. The 1×2 multimode interference device M12M1 branches the optical beam, received at the input port thereof, to the first output port and the second output port.

Referring to FIG. 4A, at the input port of the 1×2 multimode interference device M12M1, the phase difference $\Delta\theta$ between the fundamental mode and the first-order mode of the waveguide beam of the wavelength $\lambda 1$ is, for example, $+\pi/2$. The fundamental mode of the waveguide beam is branched to the first output port (X-side port) and the second output port (Y-side port) equally in intensity. The first-order mode of the waveguide beam has a branching intensity profile with an antisymmetric shape at a distance away from the input port, specifically at the positions of the first output port (X-side port) and the second output port (Y-side port). The fundamental and first-order modes are combined at the first output port (X-side port) and at the second output port (Y-side port) to generate respective combined optical beams. The first and second output ports provide a combined optical beam of the first intensity sum and a combined optical beam of the second intensity sum, respectively. The first intensity sum (Px) is greater than the second intensity sum (Py).

Referring to FIG. 4B, at the input port of the 1×2 multimode interference device M12M1, the phase difference $\Delta\theta$ between the fundamental mode and the first-order mode of the optical waveguide beam of the wavelength $\lambda 2$ is $-\pi/2$. The fundamental mode of the optical waveguide beam is branched to the first output port (X-side port) and the second output port (Y-side port) equally in intensity. The first-order mode of the waveguide beam has a branching intensity profile with an antisymmetric shape at a distance away from the input port, specifically at the positions of the first output port (X-side port) and the second output port (Y-side port). The fundamental and first-order modes are combined at the first output port (X-side port) and at the second output port (Y-side port) to generate respective combined optical beams. The combined optical beams at the first and second output ports have first and second intensity sums, respectively. The second intensity sum (Py) is greater than the first intensity sum (Px).

Figure 5A:
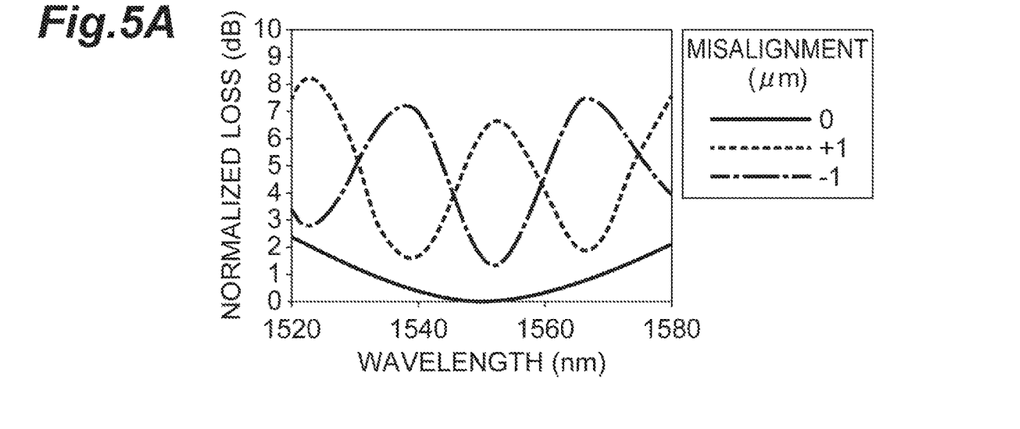
FIGS. 5A, 5B and 5C are graphs each showing the normalized intensity at the first and second output ports of the semiconductor device in the wavelength range of 1520 to 1580 nm.
Figure 5B:
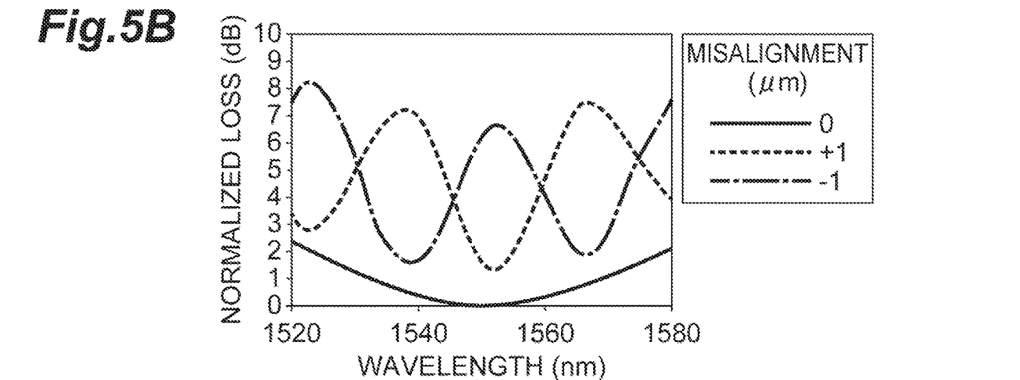
Figure 5C:
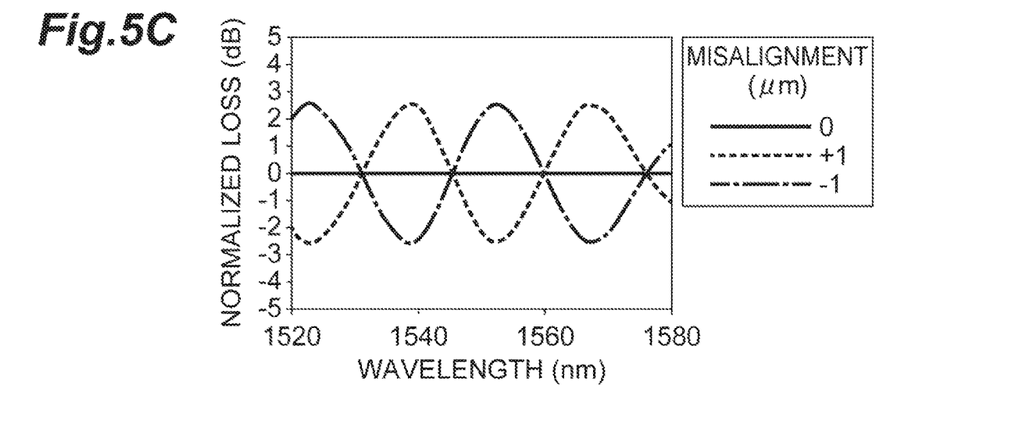

FIGS. 5A and 5B show normalized intensities at the first and second output ports in the wavelength range from 1520 nm to 1580 nm, respectively. Specifically, FIGS. 5A and 5B each show the intensity of three types of alignment (alignment deviations: 0 micrometers, +1 micrometers, and −1 micrometers), and FIG. 5C shows the difference in the normalized intensity in the three types of alignment (alignment deviations: 0 micrometers, +1 micrometers, and −1 micrometers) at the first and second output ports. As shown in FIG. 5A, the difference in normalized intensity periodically changes in the wavelength range of 1520 nm to 1580 nm.

The spot size converter 13 according to the present embodiment can attenuate odd-order modes to reduce the occurrence of imbalance in the branching ratio caused by the residual odd-order modes. Specifically, the spot size converter 13 can reduce the difference in intensity in the 1×2 multimode interference device.

FIGS. 6A, 6B, 6C, 6D, 6E and 6F are views taken along the VIa-VIa line, VIb-VIb line, VIc-VIc line, VId-VId line, VIe-VIe line, and VIf-VIf line, respectively.

Referring to FIGS. 6A to 6D, the second semiconductor waveguide structure 23, the third semiconductor waveguide structure 25, the tapered waveguide 27 and the first semiconductor waveguide structures 21 each include a laminate body 41 comprising a first cladding layer 41a, a core layer 41b, and a second cladding layer 41c. The first cladding layer 41a, the core layer 41b, and the second cladding layer 41c are disposed on the principal surface 43a of the semiconductor substrate 43, and are arranged in order in the direction normal to the principal surface 43a of the semiconductor substrate 43. If necessary, the laminate 41 may include a contact layer provided on the second cladding layer 41c. The second semiconductor waveguide structure 23, the third semiconductor waveguide structure 25, the tapered waveguide 17 and the first semiconductor waveguide structure 21 each include a common laminate 41, so that the first semiconductor waveguide structure 21, the second semiconductor waveguide structure 23, the third semiconductor waveguide structure 25, and the tapered waveguide 27 have substantially the same thickness. The spot size converter 13 can provide the tapered waveguide 27, the second semiconductor waveguide structure 23, and the third semiconductor waveguide structure 25 with the same semiconductor laminate, allowing the waveguide and waveguide structures to have the same refractive index profile in the longitudinal direction.

Figure 6A:
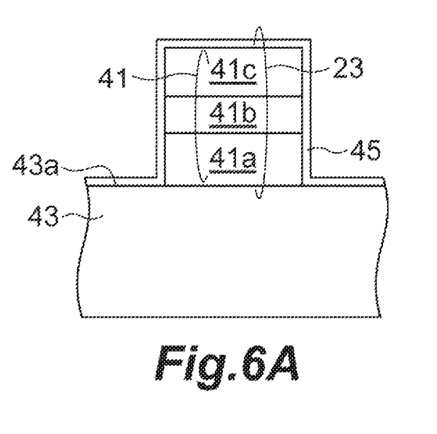
FIGS. 6A, 6B, 6C, 6D, 6E, and 6F are cross sectional views taken along the lines VIa-VIa, VIb-VIb, VIc-VIc, VId-VId, VIe-VIe, and VIf-VIf, respectively.
Figure 6B:
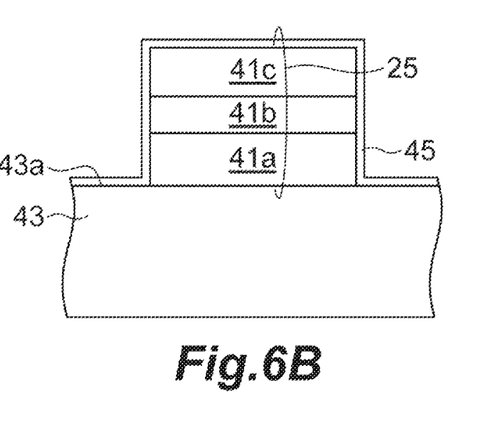
Figure 6C:
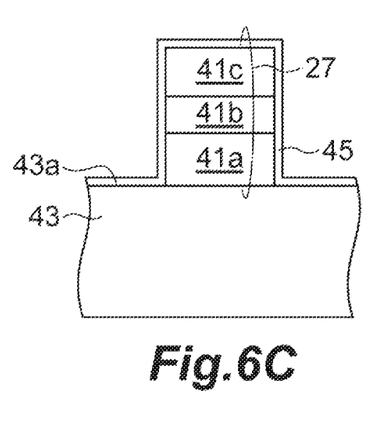
Figure 6D:
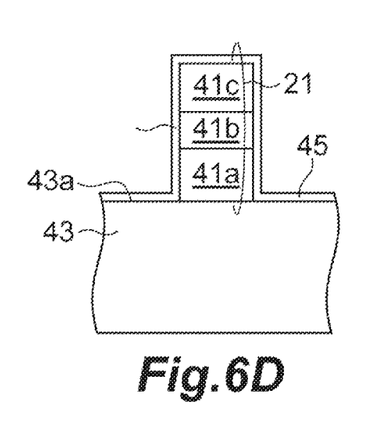
Figure 6E:
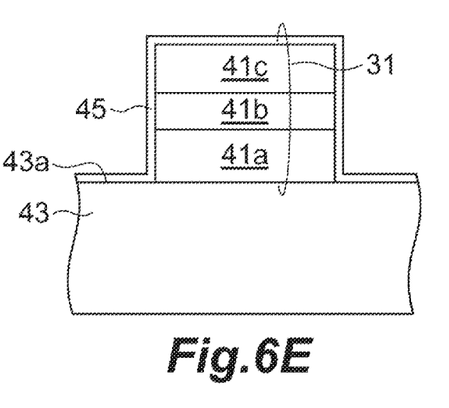
Figure 6F:
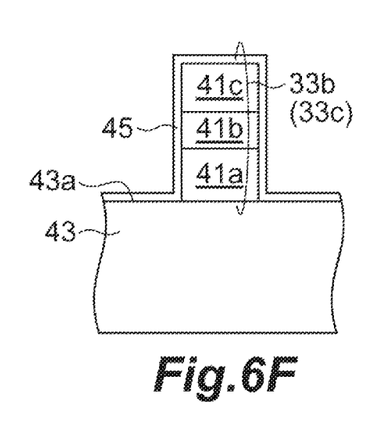

In the present embodiment, referring to FIGS. 6D, 6E and 6F, the first semiconductor waveguide structure 21, the multimode interference device 31, and the fourth semiconductor waveguide structure 33b (the fifth semiconductor waveguide structure 33c) each include the laminate 41. Accordingly, the first semiconductor waveguide structure 21, the multimode interference device 31, and the fourth semiconductor waveguide structure 33b (the fifth semiconductor waveguide structure 33c) have substantially the same thickness. The spot size converter 13 provides the first semiconductor waveguide structure 21, the multimode interference device 31, and the fourth semiconductor waveguide structure 33b (the fifth semiconductor waveguide structure 33c) with the same semiconductor laminate structure, enabling the same refractive index profile in the longitudinal direction.

The first semiconductor waveguide structure 21, the second semiconductor waveguide structure 23, the third semiconductor waveguide structure 25, and the tapered waveguide 27 may be covered with a silicon-based inorganic insulating film 45. In the present spot size converter 13, the refractive index of the silicon-based inorganic insulating film 45 is smaller than that of the semiconductor region constituting the spot size converter 13. The silicon-based inorganic insulating film 45 may include, for example, silicon oxide, silicon nitride, and silicon oxynitride.

Figure 7A:
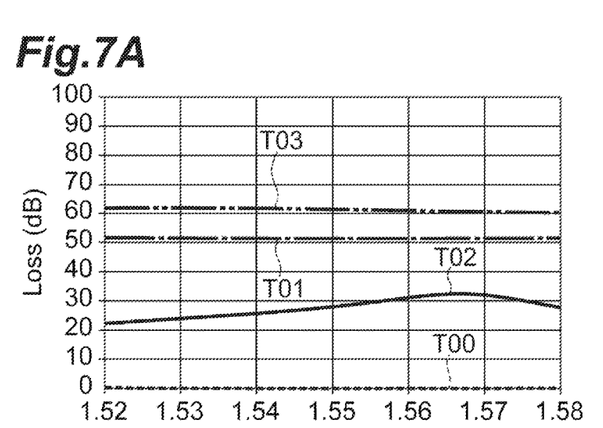
FIGS. 7A, 7B, 7C and 7D are graphs each showing the behaviors of the fundamental mode and the higher-order modes in the third semiconductor waveguide structure.
Figure 7B:
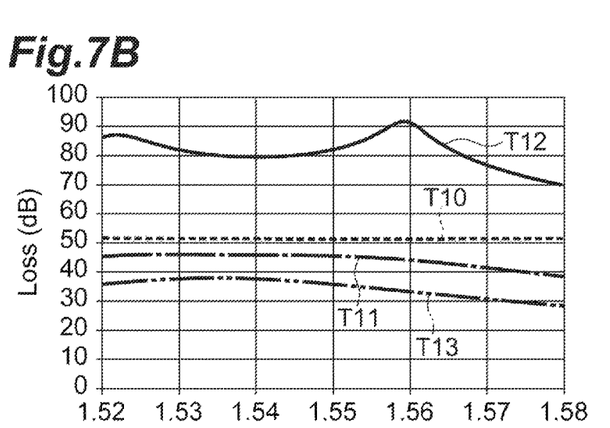
Figure 7C:
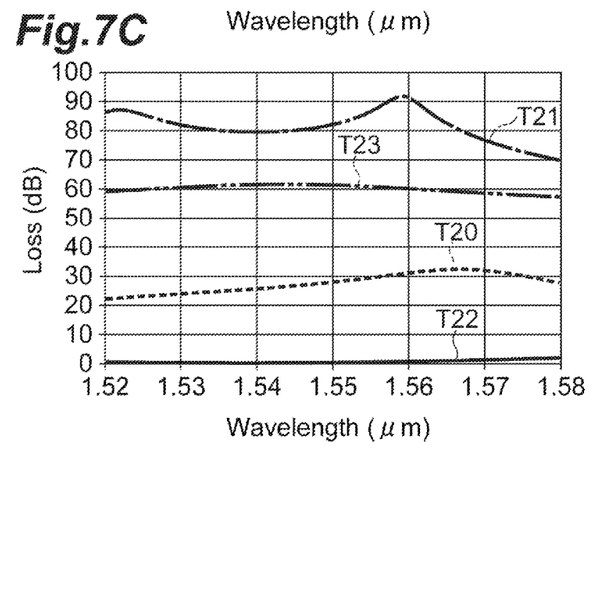
Figure 7D:
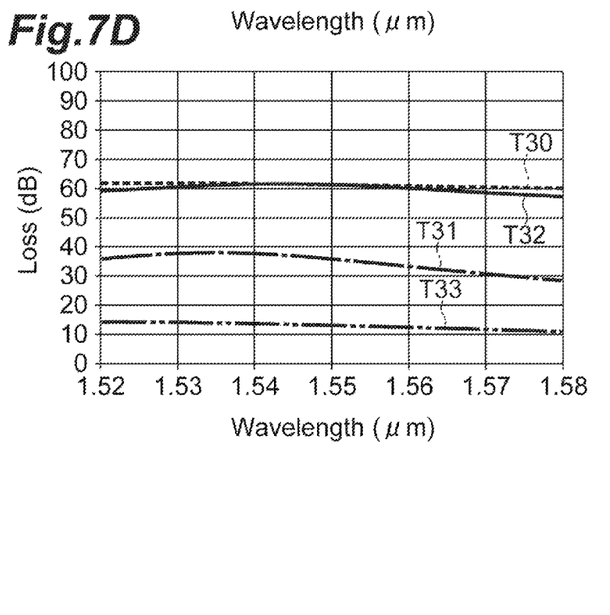

The second semiconductor waveguide structure 23 receives an optical beam from an external optical waveguide at the end face 23a thereof. Entering the second semiconductor waveguide structure 23 from the external optical waveguide generates an optical beam including not only the fundamental mode but also higher-order modes generated by excitation of light. The optical beam enters the third semiconductor waveguide structure 25 from the second semiconductor waveguide structure 23. FIGS. 7A to 7D show behaviors of the fundamental mode and the higher-order modes in the third semiconductor waveguide structure 25. FIG. 7A shows characteristics T00, T01, T02, and T03 indicating transitions from the fundamental mode to the fundamental, first-order, second-order and third-order modes. FIG. 7B shows characteristics T10, T11, T12, and T13 indicating transitions from the first-order mode to the fundamental, first-order, second-order, and third-order modes. FIG. 7C shows characteristics T20, T21, T22, and T23 indicating transitions from the second-order mode to the fundamental, first-order, second-order, and third-order modes. FIG. 7D shows characteristics T30, T31, T32, and T33 indicating transitions from the third-order mode to the fundamental, first-order, and second-order, and third-order modes. In these figures, for example, "02" indicates a transition from the fundamental mode to the second-order mode.

Estimates in FIGS. 7A to 7D are made in the following model.
Second width W23 of the second semiconductor waveguide structure 23: 3.5 micrometers.
Third width W25 of the third semiconductor waveguide structure 25: 9.6 micrometers.
Third length L25 of the third semiconductor waveguide structure 25: 194 micrometers.
Laminate of the third semiconductor waveguide structure 25: InP/MQW/InP.
MQW: AlGaInAs well/AlGaInAs barrier, 0.5 micrometer thick.
InP layer: 1.5 micrometers thick.

The third semiconductor waveguide structure 25 of the third width W25, which has larger than the first width W21 of the first semiconductor waveguide structure 21 and the second width W23 of the second semiconductor waveguide structure 23, cause a large loss of the first-order mode and a loss of the third-order mode to any modes. The third semiconductor waveguide structure 25 attenuates several higher-order modes in the optical beam received from the second semiconductor waveguide structure 23. Estimates conducted by the inventor reveal that the second-order and third-order modes are radiated to the outside of the waveguide in propagating the first semiconductor waveguide structure 21 of the first width W21. The tapered waveguide 27 receives the optical beam from the third semiconductor waveguide structure 25. The spot size conversion of the optical beam follows the attenuation of a part of the higher-order modes in the incident beam. The sequence of conversion of the spot size and the attenuation of the higher-order modes is significant in reducing the occurrence of leakage mode. The leakage mode is an intermediate mode between a waveguide mode with no radiation loss and a radiation mode with a large radiation loss. The leakage mode can propagate along the waveguide with a small radiation loss because the radiation loss of the leakage mode is very small compared to the radiation mode. The leakage mode of the small radiation loss reaching an optical element may cause unexpected operation of the element. The amount of the leakage mode should be made reduced. A spot size converter as in FIGS. 4A and 4B, which consists solely of a tapered waveguide, causes the tapered waveguide to convert a higher-order mode, excited in the entry thereto, into a leakage mode. The leakage mode that has passed through the spot size converter propagates through the waveguide, and may cause a problem in view of the device performance as described above. But, in the present embodiment, the spot size conversion using the tapered waveguide follows the attenuation of higher order modes, and the spot size converter according to the present embodiment prevents the leakage mode from occurring in the tapered waveguide.

Figure 8:
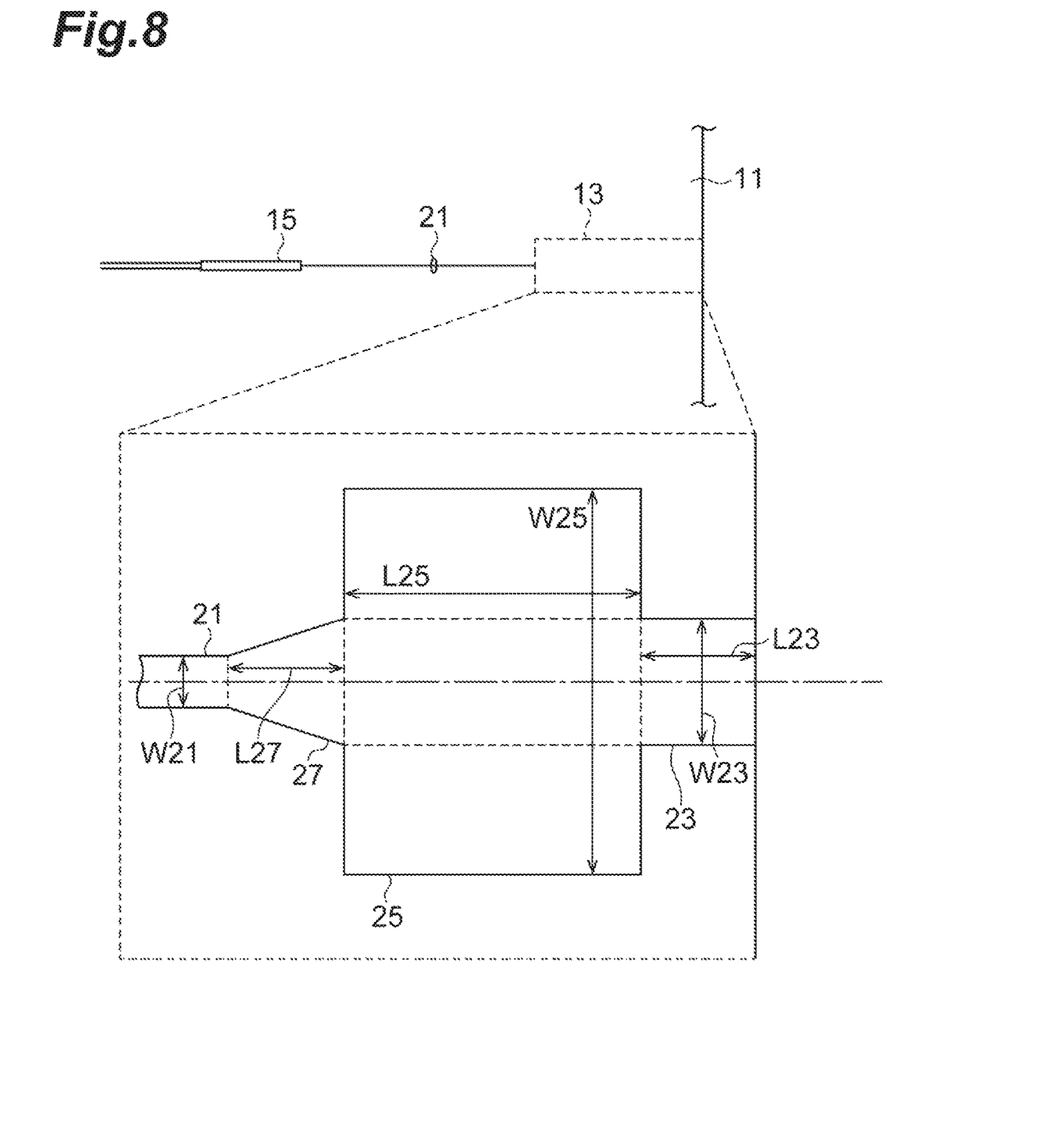
FIG. 8 is a schematic view showing a spot size converter.

FIG. 8 shows an exemplary spot size converter 13. The spot size converter 13 according the embodiment has typical dimensions as follows.

First width W21: 0.5 to 2 micrometers, for example, one micrometer.

Second width W23: 1.5 to 15 micrometers, for example, 3.5 micrometers.

Second length L23: 5 to 100 micrometers, for example, 40 micrometers.

Third width W25: 2 to 20 micrometers, for example, 9.6 micrometers.

Third length L25: 20 to 400 micrometers, for example, 194 micrometers.

Length L27 of the tapered waveguide: 10 to 200 micrometers, for example, 80 micrometers.

The spot size converter 13 according to the embodiment is fabricated by the following exemplary method. A semiconductor stack is formed on an InP substrate. In order to form a semiconductor laminate, an InP layer for the lower cladding layer, a multiple quantum well structure composed of AlGaInAs well AlGaInAs barrier for the MQW core layer, and an InP layer for the upper cladding layer can be grown by an organic metal vapor phase growth method. If necessary, an InGaAs layer for the contact layer of the semiconductor optical device 15 can be grown in forming the semiconductor laminate. A mask defining the waveguide pattern is formed on the principal surface of the semiconductor laminate. The semiconductor laminate is etched with the mask to form a semiconductor mesa. After this etching, a silicon-based inorganic insulating film is grown on the InP substrate and the top and side of the semiconductor mesa. The step of forming electrodes necessary for the semiconductor optical device 15, for example a Mach-Zehnder modulator, follows the above film growth.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. A spot size converter including:
   a first semiconductor waveguide structure having a first width enabling single mode propagation;
   a second semiconductor waveguide structure having a second width greater than the first width, the second semiconductor waveguide structure including an end face for optically coupling with an external waveguide, and the second width enabling one or more higher-order mode propagations;
   a third semiconductor waveguide structure having a third width greater than the first width and the second width, the third semiconductor waveguide structure being optically coupled to the second semiconductor waveguide structure; and
   a single tapered waveguide having a first end portion connected to the third semiconductor waveguide structure, and a second end portion connected to the first semiconductor waveguide structure, the single tapered waveguide having a width gradually changing in a direction from the first end portion to the second end portion,
   wherein the first semiconductor waveguide structure, the single tapered waveguide, the second semiconductor waveguide structure, and the third semiconductor waveguide structure are covered with a silicon-based inorganic insulating film;
   wherein the third semiconductor waveguide structure attenuates odd-higher modes included in the one or more higher-order modes from the second semiconductor waveguide structure so as to produce a filtered beam, and
   wherein the first semiconductor waveguide structure radiates second-order and third-order modes outside of the first semiconductor waveguide structure.

2. The spot size converter according to claim 1, wherein each of the single tapered waveguide, the second semiconductor waveguide structure, and the third semiconductor waveguide structure includes a laminate, and the laminate includes a first cladding layer, a core layer, and a second cladding layer.

3. The spot size converter according to claim 1, wherein the second width of the second semiconductor waveguide structure is 1.5 micrometers or more.

4. A semiconductor optical device including:
   a spot size converter disposed on a substrate; and
   a semiconductor optical element optically coupled to the spot size converter, the semiconductor optical element being disposed on the substrate,
   the spot size converter including:
   a first semiconductor waveguide structure having a first width enabling single mode propagation;
   a second semiconductor waveguide structure having a second width greater than the first width, the second semiconductor waveguide structure including an end face for optically coupling with an external waveguide, and the second width enabling one or more higher-order mode propagations;
   a third semiconductor waveguide structure having a third width greater than the first width and the second width, the third semiconductor waveguide structure being optically coupled to the second semiconductor waveguide structure; and a single tapered waveguide having a first end portion connected to the third semiconductor waveguide structure, and a second end portion connected to the first semiconductor waveguide structure, the single tapered waveguide having a width gradually changing in a direction from the first end portion to the second end portion, wherein the first semiconductor waveguide structure, the single tapered waveguide, the second semiconductor waveguide structure, and the third semiconductor waveguide structure are covered with a silicon-based inorganic insulating film, wherein the third semiconductor waveguide structure attenuates odd-higher modes from the second semiconductor waveguide structure so as to produce a filtered beam, and wherein the first semiconductor waveguide structure radiates second-order and third-order modes outside of the first semiconductor waveguide structure.

5. A semiconductor optical device including a spot size converter disposed on a substrate, the spot size converter comprising:
   a first semiconductor waveguide structure having a first width enabling single mode propagation;
   a second semiconductor waveguide structure having a second width greater than the first width, the second semiconductor waveguide structure including an end face for optically coupling with an external waveguide;
   a third semiconductor waveguide structure having a third width greater than the first width and the second width, the third semiconductor waveguide structure being optically coupled to the second semiconductor waveguide structure; and
   a single tapered waveguide having a first end portion connected to the third semiconductor waveguide structure, and a second end portion connected to the first semiconductor waveguide structure, the single tapered waveguide having a width gradually changing in a direction from the first end portion to the second end portion,
   wherein each of the first semiconductor waveguide structure, the single tapered waveguide, the second semiconductor waveguide structure, and the third semiconductor waveguide structure has a top face in direct contact with an insulating film.

6. The semiconductor optical device according to claim 5, wherein each of the first semiconductor waveguide structure, the single tapered waveguide, the second semiconductor waveguide structure, and the third semiconductor waveguide structure has a side in direct contact with a silicon-based inorganic insulating film.

7. The semiconductor optical device according to claim 5, wherein the first semiconductor waveguide structure, the single tapered waveguide, and the second semiconductor waveguide structure are arranged in a direction of an axis.

8. The semiconductor optical device according to claim 5, wherein the end face of the second semiconductor waveguide structure is located at an edge of the semiconductor optical device.

9. The semiconductor optical device according to claim 5, wherein the second semiconductor waveguide structure has one side face and another side face, and
   wherein, at the first end portion of the tapered waveguide, the tapered waveguide has one side face and another side face in alignment respectively with the one side face and the other side face of the second semiconductor waveguide structure.

10. The semiconductor optical device according to claim 5, further including a semiconductor optical element optically coupled to the spot size converter,
    wherein the semiconductor optical element is disposed on the substrate, and
    wherein the semiconductor optical element is apart from the single tapered waveguide by 200 micrometers or more.

11. The semiconductor optical device according to claim 10,
    wherein the semiconductor optical element has a multimode interference device connected to the first semiconductor waveguide structure.

12. The semiconductor optical device according to claim 11,
    wherein the multimode interference device includes a 1×2 MMI.

13. The semiconductor optical device according to claim 11, further including first and second Mach-Zehnder modulators coupled to the multimode interference device, the first and second Mach-Zehnder modulators being disposed on the substrate, and the substrate being made of semiconductor.

14. The semiconductor optical device according to claim 10,
    wherein the semiconductor optical element has a Mach-Zehnder modulator connected to the first semiconductor waveguide structure.

15. The semiconductor optical device according to claim 5,
    wherein the second width is 1.5 micrometers or more.

16. The semiconductor optical device according to claim 5,
    wherein each of the first semiconductor waveguide structure, the single tapered waveguide, the second semiconductor waveguide structure, and the third semiconductor waveguide structure has a first cladding layer, a second cladding layer, and a core layer disposed between the first and second cladding layers, and
    wherein the core layer has an MQW with AlGaInAs wells and AlGaInAs barriers allowing a light beam of a wavelength in a range of 1520 to 1580 nanometers to propagate.

* * * * *